United States Patent
Berkes et al.

(10) Patent No.: US 9,411,509 B2
(45) Date of Patent: Aug. 9, 2016

(54) VIRTUAL CONTROLLER FOR TOUCH DISPLAY

(75) Inventors: Otto Berkes, Seattle, WA (US); Joseph H. Matthews, III, Woodinville, WA (US); Avi Geiger, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 663 days.

(21) Appl. No.: 12/981,139

(22) Filed: Dec. 29, 2010

(65) Prior Publication Data

US 2012/0169610 A1    Jul. 5, 2012

(51) Int. Cl.
G06F 3/0488 (2013.01)
G06F 3/041 (2006.01)
G06F 3/01 (2006.01)

(52) U.S. Cl.
CPC .......... *G06F 3/04886* (2013.01); *G06F 3/0412* (2013.01); *G06F 3/0414* (2013.01); *G06F 3/04883* (2013.01); *A63F 2300/1075* (2013.01); *A63F 2300/204* (2013.01);
(Continued)

(58) Field of Classification Search
CPC .................. G06F 3/041–3/044; G06F 3/0488; G06F 3/04883; G06F 3/04886; G06F 3/01; G06F 2203/04808; A63F 13/00; A63F 13/20; A63F 13/2145; A63F 13/218; A63F 13/22; A63F 13/40; A63F 2300/00–2300/80
USPC ................................................ 345/173–178
See application file for complete search history.

(56) References Cited

U.S. PATENT DOCUMENTS

| 6,515,689 B1 | 2/2003 | Terashima |
| 6,572,108 B1 | 6/2003 | Bristow |
| 7,708,641 B2 | 5/2010 | Tawara |

(Continued)

FOREIGN PATENT DOCUMENTS

| CN | 101681234 A | 3/2010 |
| JP | H11164175 A | 6/1999 |

(Continued)

OTHER PUBLICATIONS

Viciana-Abad, et al., "Difficulties Using Passive Haptic Augmentation in the Interaction within a Virtual Environment", Retrieved at<< http://www.temple.edu/ispr/prev_conferences/proceedings/2005/Viciana-Abad,%20Reyes-Lecuona,%20Canadas-Quesada.pdf>>, 2005, pp. 287-292.

(Continued)

*Primary Examiner* — David Tung
(74) *Attorney, Agent, or Firm* — Aneesh Mehta; Kate Drakos; Micky Minhas

(57) ABSTRACT

Systems and methods are provided for use with a computing device having a touch sensitive display including a touch sensor configured to detect touches of a digit of a user. The method may include detecting an initial digit down position on the display via the touch sensor, and establishing a neutral position for a virtual controller at the digit down position. The method may further include detecting a subsequent movement of the digit relative to the initial digit down position, and determining a controller input parameter based on the subsequent movement of the digit relative to the initial digit down position. The method may further include generating a controller input message indicating the determined controller input parameter.

17 Claims, 4 Drawing Sheets

(52) U.S. Cl.
CPC .. *A63F 2300/609* (2013.01); *A63F 2300/6045* (2013.01); *G06F 3/01* (2013.01); *G06F 2203/04808* (2013.01)

(56) References Cited

U.S. PATENT DOCUMENTS

| | | | |
|---|---|---|---|
| 7,728,820 | B2 | 6/2010 | Rosenberg et al. |
| 7,780,527 | B2 | 8/2010 | Gauselmann |
| 2006/0111180 | A1 | 5/2006 | Cheng |
| 2007/0265081 | A1 | 11/2007 | Shimura et al. |
| 2008/0309626 | A1 | 12/2008 | Westerman et al. |
| 2009/0205878 | A1 | 8/2009 | Taylor |
| 2009/0207144 | A1* | 8/2009 | Bridger ................. 345/173 |
| 2010/0156813 | A1 | 6/2010 | Duarte et al. |
| 2011/0285636 | A1* | 11/2011 | Howard et al. ........... 345/173 |

FOREIGN PATENT DOCUMENTS

| | | | |
|---|---|---|---|
| JP | 2006139615 | A | 6/2006 |
| JP | 2008217548 | A | 9/2008 |
| JP | 2009025848 | A | 2/2009 |
| JP | 2010073071 | A | 4/2010 |
| JP | 2010530578 | A | 9/2010 |
| KR | 1020080076200 | A | 8/2008 |
| KR | 1020100027311 | A | 3/2010 |
| KR | 1020100134339 | A | 12/2010 |
| WO | 2007055213 | A1 | 5/2007 |
| WO | 2010075136 | A2 | 7/2010 |

OTHER PUBLICATIONS

"International Search Report", Mailed Date: Sep. 27, 2012, Application No. PCT/US2011/067426, Filed Date: Dec. 27, 2011, pp. 9.
State Intellectual Property Office of China, Office Action for Chinese Patent Application No. 201110448471.5, Feb. 25, 2014, 17 pages.
State Intellectual Property Office of China, Second Office Action for Chinese Patent Application No. 201110448471.5, Jan. 20, 2015, 6 Pages.
State Intellectual Property Office of the People's Republic of China, Notice of Allowance Issued in Application No. 201110448471.5, Jul. 31, 2015, 6 pages.
Japan Patent Office, Office Action Issued in Japanese Patent Application No. 2013-547623, Jan. 5, 2016, Japan, 5 pages.
Taiwan Intellectual Property Office, Office Action and Search Report issued in Application No. 100143766, Jun. 7, 2016, Taiwan, 8 pages.

* cited by examiner

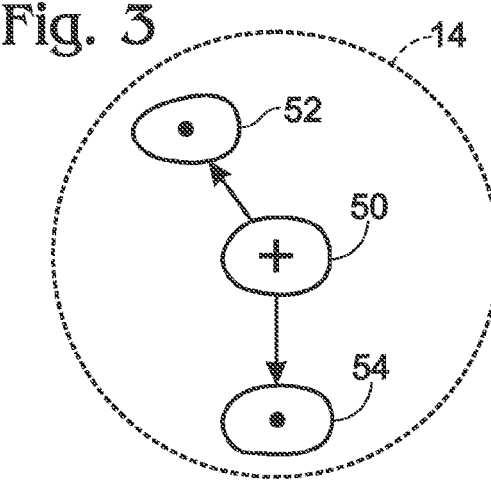
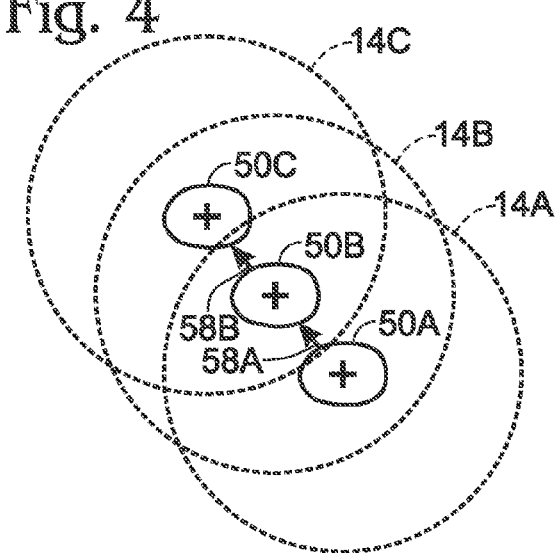
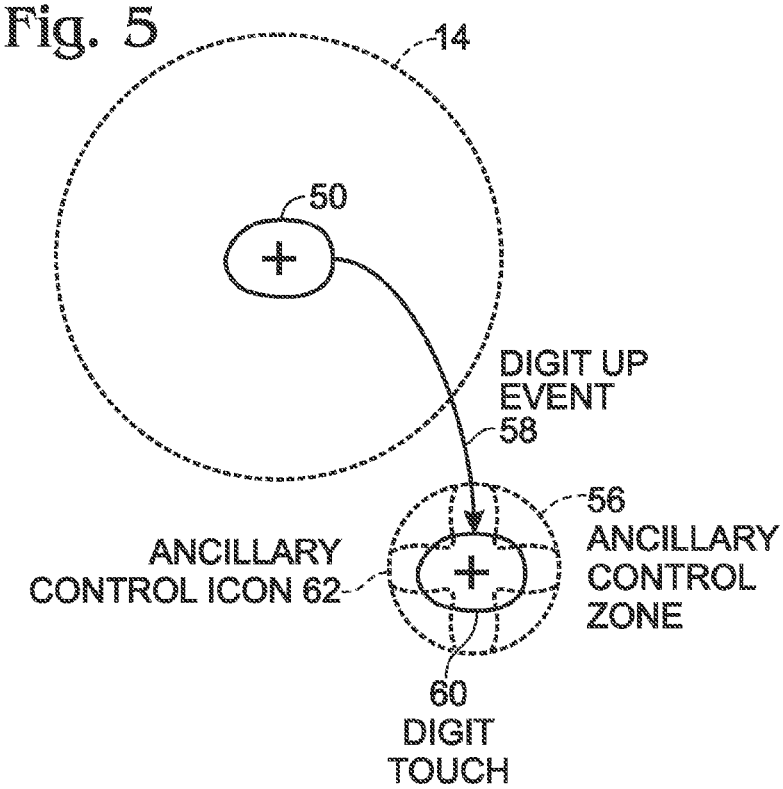

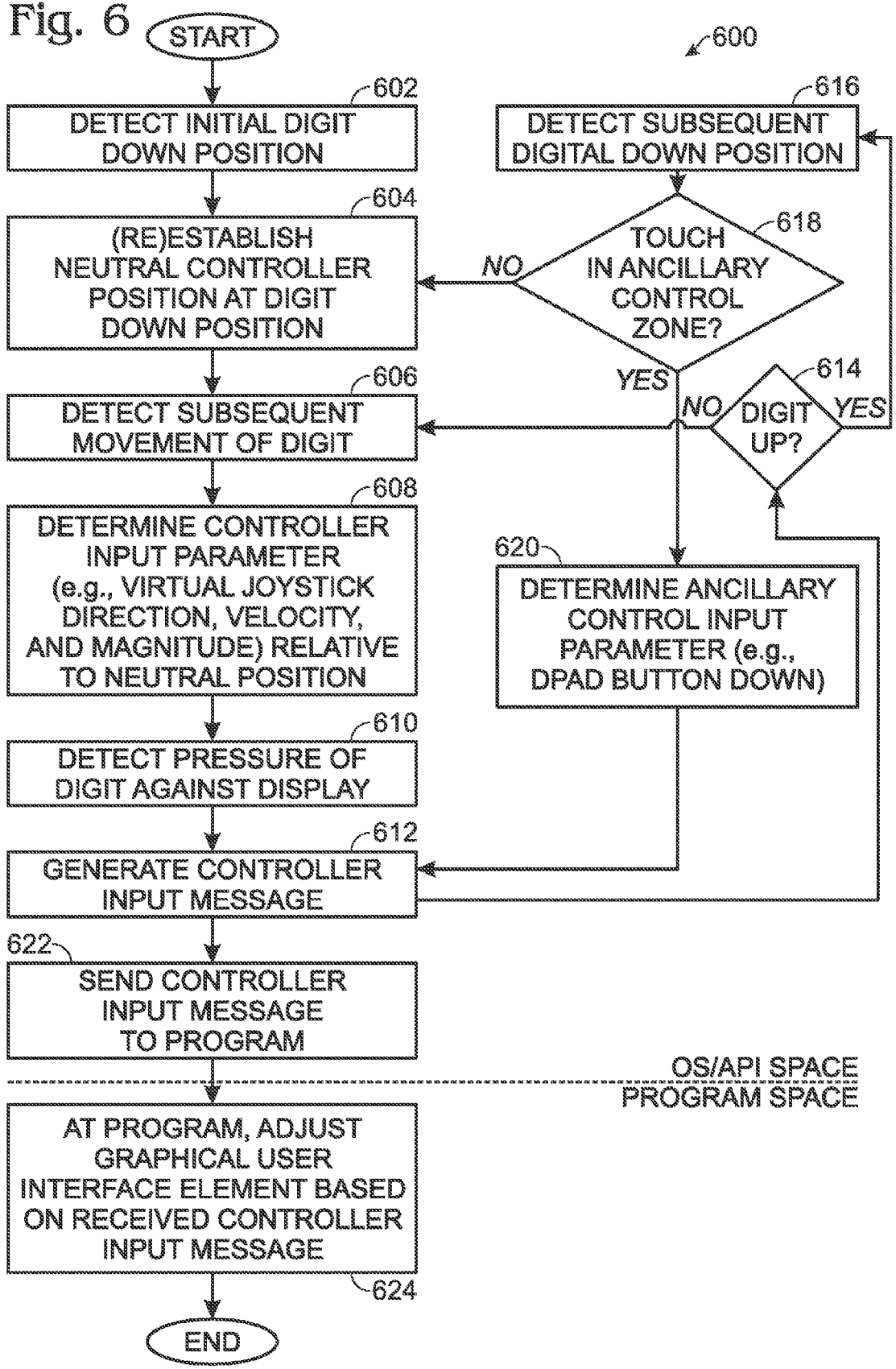

VIRTUAL CONTROLLER FOR TOUCH DISPLAY

BACKGROUND

Portable gaming devices are enjoyed by many users around the world. One type of such gaming device includes both hard button controls, which provide the user with tactile feedback to reinforce correct finger positioning on the control, as well as a touch screen, which enables the user to interact with a game using, for example, a stylus. One drawback of such a device is that the hard buttons take up valuable space in the device, constraining the size of the display, and increasing the size of the housing. Reducing the size of the hard buttons is challenging because small buttons are often difficult for users to actuate, particularly during fast paced game play. Further, in the context of a gaming device that also functions as a multifunction tablet computing device or mobile telephone, dedicated buttons on the front of the device devoted specifically for game play may detract from the usefulness or appearance of the device to those consumers who do not play games.

SUMMARY

Systems and methods are provided for use with a computing device having a touch sensitive display including a touch sensor configured to detect touches of a digit of a user. The method comprising detecting an initial digit down position on the display via the touch sensor, and establishing a neutral position for a virtual controller at the digit down position. The method may further include detecting a subsequent movement of the digit relative to the initial digit down position, and determining a controller input parameter based on the subsequent movement of the digit relative to the initial digit down position. The method may further include generating a controller input message indicating the determined controller input parameter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a graphical view of a neutral position illustrating relative movement for the virtual controller of FIG. 1.

FIG. 4 is a graphical view of a reposition of a neutral position for the virtual controller of FIG. 1.

FIG. 5 is a graphical view of a thumb up event to actuate a control icon of FIG. 1.

FIG. 6 is a flowchart illustrating a method for a computing device configured to output a virtual controller for a touch sensitive display.

DETAILED DESCRIPTION

Figure 1:
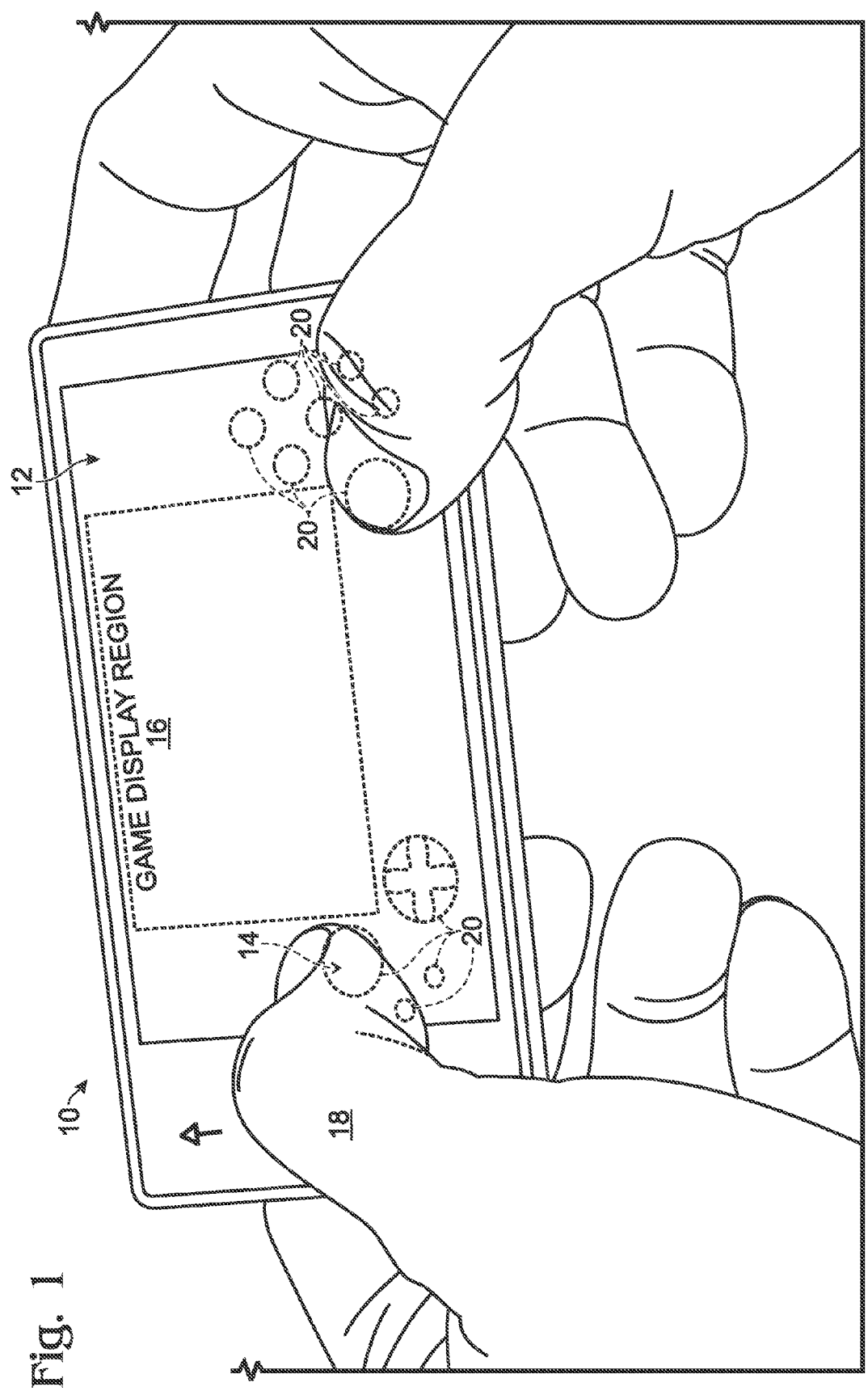
FIG. 1 is a perspective view of a computing device of one embodiment showing a virtual controller for a touch display.

FIG. 1 is a perspective view of one embodiment of a computing device 10 showing a virtual controller 14 for a touch sensitive display. Computing device 10 may be configured as a mobile telephone, tablet computer, or other handheld computing device, for example. Computing device 10 may comprise a touch sensitive display such as a multi-touch display 12 including a touch sensor configured to detect a plurality of touches of a digit of a user, which will be discussed in greater detail with respect to FIG. 2. Further, computing device 10 may be configured to receive input from a user via the plurality of touches and may implement an input method in order to control a virtual controller 14. Such a method will be described in detail with respect to FIG. 6.

Turning first to FIG. 1, computing device 10 may display the virtual controller 14 on the multi-touch display 12 in a configuration that enables a user to control a program, such as a video game. In the depicted embodiment, virtual controller 14 is a game controller including a virtual joystick controller that may be used to control aspects of a video game, thereby enabling game play in a game display region 16. Typically, the virtual controller is presented in a manner that does not unduly visually interfere with the display of the game display region. In another embodiment, the virtual controller input module may provide aural feedback corresponding to virtual controller inputs through speaker/microphone unit 26.

Virtual controller 14 may be responsive to a plurality of touches of a digit of a user. For example, the digit may be a thumb 18, which may move in any general direction, and this movement may be translated by virtual controller 14 into a one or more controller input parameters. The controller input parameters may include a direction, velocity, and/or relative magnitude corresponding to the movements of thumb 18. As a result, in some embodiments, one or more control icons 20 may provide a visual indication to the user of the positioning of the control, which is updated as the user moves his or her digit.

One or more control icons 20 may represent one or more virtual controllers 14 and/or one or more ancillary controllers that may allow the user to control different aspects of the game. Control icons 20 may each be one or more of a virtual joystick, a button, a D-pad button, a slider, and any other feature that may be actuated to control an aspect of the game. In the embodiment illustrated in FIG. 1, it will be appreciated that the virtual controller implements a MICROSOFT® XBOX® controller. Other controller implementations may be utilized as well.

Typically, the virtual controller is presented in a manner that does not unduly visually interfere with the display of the game display region. Thus, in some embodiments, no controller icons are provided on the display, to maximize viewable area of a game play region on the display. In other embodiments, icons may be partially transparent to reveal game play thereunder, or icons may be presented for a brief period of time and then fade away.

Figure 2:
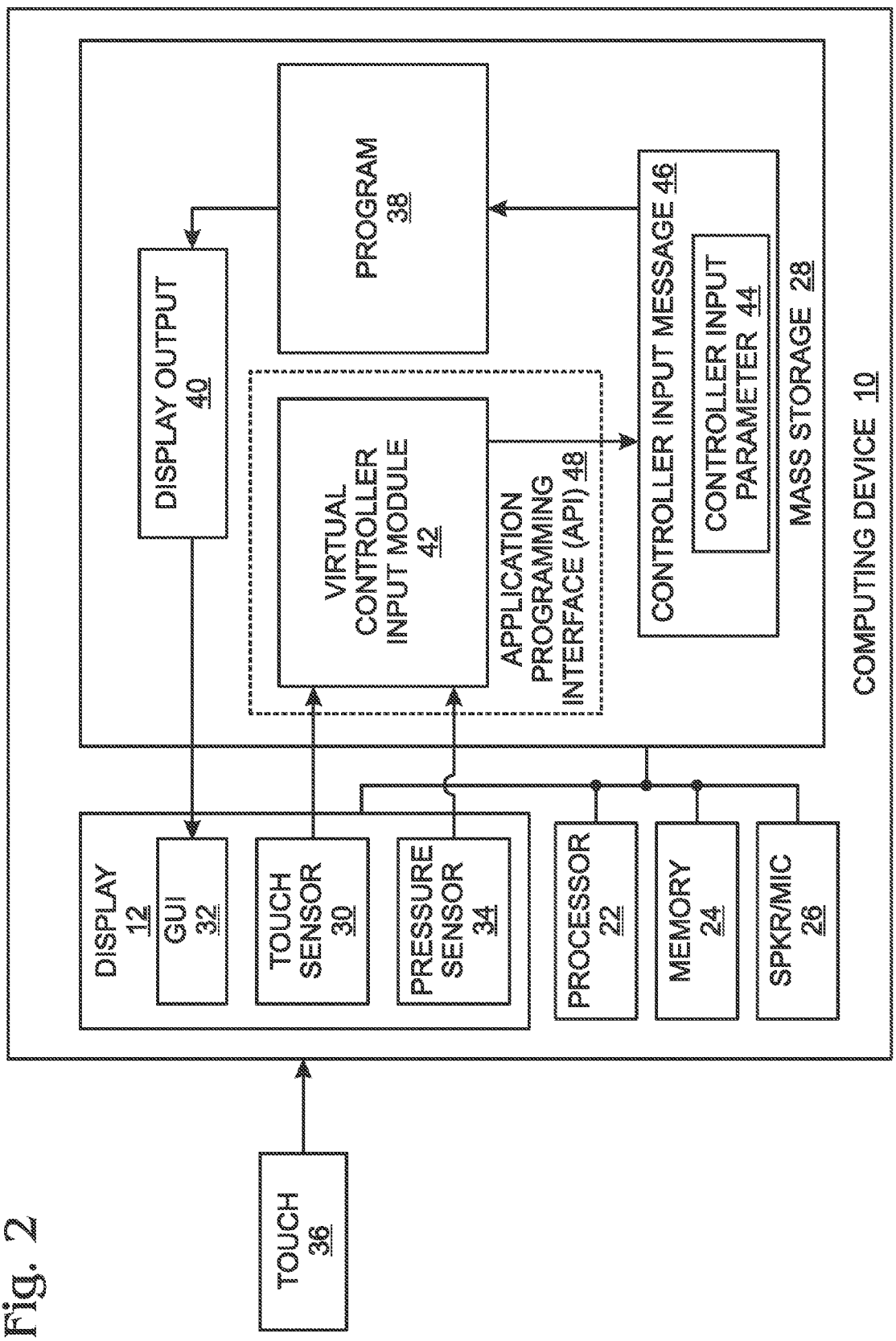
FIG. 2 is a schematic view of the computing device of FIG. 1.

FIG. 2 is a schematic view illustrating software and hardware components of computing device 10 of FIG. 1. Computing device 10 includes the multi-touch display 12, a processor 22, memory unit 24, speaker/microphone unit 26, and mass storage unit 28, all configured to communicate with each other via one or more data buses.

Multi-touch display 12 may employ a variety of display technologies for producing a viewable image, and may include a graphical user interface (GUI) 32, for example. Multi-touch display 12 may be configured as a liquid crystal display (LCD) or an organic light emitting diode (OLED) display comprised of a plurality of light emitting pixels, for example. Multi-touch display 12 may further include a touch sensor 30 and a pressure sensor 34.

Touch sensor 30, coupled to multi-touch display 12, may detect a plurality of touches of a digit of a user, such as touch 36. Pressure sensor 34, coupled to multi-touch display 12, may detect pressure from changes in area of a touch 36 associated with a digit over time, or from changes in an electrical characteristic associated with increased pressure, thereby functioning as a strain gauge. Multi-touch display 12 may include additional or alternative sensors without departing from the scope of this disclosure.

Mass storage unit 28 may include various programs and modules, including a virtual controller input module 42 and program 38, which may be executed by processor 22 using memory unit 24 and display 12 to achieve various functions described herein. Further, mass storage unit 28 may store one or more programs 38 that may be configured to send a display output 40 that may control the display of GUI 32 on multi-touch display 12, for example.

It will be appreciated that the computing device 10 may include an operating system that includes an application programming interface (API) by which various programs communicate with and utilize operating system resources. In some embodiments, the virtual controller input module 42 may be implemented as an API 48 on the computing device. Alternatively, the virtual controller input module may be implemented as a program, library, service, or other software component executed on computing device 10.

Virtual controller input module 42 may be executed by processor 22 of computing device 10. Virtual controller input module 42 may be configured to detect a plurality of digits of a user as touches, and movements corresponding to those touches, on multi-touch display 12 via touch sensor 30, pressure sensor 34, and/or additional sensors. In this way, virtual controller input module 42 may translate data received by one or more sensors, generate a controller input message 46 based on this data, and send the message to program 38.

For example, virtual controller input module 42 may detect an initial digit down position on multi-touch display 1 via touch sensor 30. Additionally, virtual controller input module 42 may establish a neutral position for virtual controller 14 at the initial digit down position. In other words, virtual controller input module 42 may detect an initial touch when a digit contacts multi-touch display 12. Further, virtual controller input module 42 may be configured to display a control icon anchored, or controllably centered, at the neutral position. After establishing a neutral position, virtual controller input module 42 may be configured to detect a subsequent movement of the digit relative to the initial digit down position, for example. Such touches and movements, among others, will be discussed in greater detail with respect to FIGS. 3-6.

Virtual controller input module 42 may be configured to determine a controller input parameter 44 based on, for example, the subsequent movement of the digit relative to the initial digit down position. Determining controller input parameter 44 may include determining a direction, velocity, and/or relative magnitude of the subsequent movement of the digit relative to the initial digit down position, for example. Further, a controller input message 46 indicating the determined controller input parameter 44 may be generated by virtual controller input module 42, and sent to the program 38. Controller input message 46 functions as a communication pathway between the virtual controller input module and the program 38, which as described above may be a video game or other program. This message may include the controller input parameters 44 based on the detected subsequent movement, and/or the various other controller input parameters discussed below.

As one example of another controller input parameter 44, controller input message 46 may include an indication of a pressure of a digit against multi-touch display 12 during a subsequent movement, wherein the pressure is detected based on a signal received from pressure sensor 34. The detected pressure may be based on changes in area of a touch associated with the digit over time, or based on changes in electrical characteristics detected by a strain gauge, for example.

Additionally, virtual controller input module 42 may detect a plurality of touches of a digit of a user for other controllers, for example, ancillary controllers that may control aspects of a game different from virtual controller 14. Such ancillary controllers may be associated with an ancillary control zone, which will be discussed in greater detail with respect to FIG. 5. Controller input parameters based on output from these ancillary controllers also may be included in controller input message 46.

As described above, the virtual controller input module 42 may be implemented as an application programming interface (API) 48. Thus, for example, detecting the initial digit down position, establishing the neutral position, detecting the subsequent movement, determining the controller input parameter 44 and generating the controller input message 46 may be performed by application programming interface 48 executed on computing device 10. Further, application programming interface 48 may output controller input message 46 to program 38 to be executed on computing device 10. In other embodiments, virtual controller input module 42 may be implemented as a driver stand alone executable program, a library, a service, or other type of software component.

FIG. 3 is a graphical view of neutral position 50 illustrating relative movement for virtual controller 14 of FIG. 1. As shown, a digit of a user may make contact corresponding to an initial digit down position and establish neutral position 50 at the initial digit down position, as described above. A user may control virtual controller 14 by making movements relative to neutral position 50. For example, a user may make a subsequent movement, such that a digit is moved to position 52, or a user may make a subsequent movement such that a digit is moved to position 54. Each movement may occur while the digit continues to contact multi-touch display 12, and may translate as different control inputs which are interpreted by program 36 in different ways. For example, a subsequent movement to position 52 may result in steering a virtual vehicle forward and to the left, whereas a subsequent movement to position 54 may result in putting a virtual vehicle in reverse. It will be appreciated that a subsequent movements may be detected in positions other than those described.

FIG. 4 is a graphical view of a repositioning of neutral position 50 for virtual controller 14 of FIG. 1. At times, a user may lift a digit from the surface of multi-touch display 12, and may follow with a subsequent digit down position to continue to control virtual controller 14. Without repositioning the virtual controller, a user may find that his or her grip on the computing device causes creep in subsequent digit down positions. As a result, the user may inadvertently misstrike the virtual controller leading to an unsatisfying user experience, tragic consequences in a video game, etc.

To address this issue, the virtual controller input module 42 is configured to reposition the neutral position as such creep is detected. This repositioning may be implemented as follows. As shown in FIG. 4, a digit of a user may make contact corresponding to an initial digit down position and establish neutral position 50 for virtual controller 14 at the initial digit down position, as described above. The virtual controller input module 42 may be configured to detect a digit up event 58, wherein digit up event 58 may be a lack of contact of the digit and the multi-touch display 12 for a predetermined threshold period of time, for example.

The virtual controller input module 42 may be configured to detect a first and second subsequent digit down positions, and reposition the neutral position to the corresponding positions at 50B, 50C at the centroid, or other position relative to, the subsequent digit down positions, thereby resulting in virtual controller being repositioned as shown at 14B, 14C.

In some scenarios, a user may position a digit such that the neutral position may be substantially close to a border of multi-touch display 12, and may therefore result in a partial virtual controller. To resolve this issue, a nearest acceptable position for the neutral position may be determined and a control icon may be displayed at the nearest acceptable position. Thus, the virtual controller input module 42 may be configured to determine a nearest acceptable virtual controller position if the digit down position and/or the subsequent digit down position occurs in a region adjacent a border of the touch sensitive display that would result in an actuable area of the virtual controller being impeded by the border. In some embodiments, the nearest acceptable position may be deemed to be a nearest position to a user's digit down position that enables the entire actuable area of the virtual controller to be positioned on the display. This feature may be optionally included, for example during beginner modes, to allow a user to become comfortable with the virtual controller.

In another example, the detected neutral position may be rejected without determining the nearest acceptable position, and thus a control icon may not be displayed at the nearest acceptable position. In another example, the partial virtual controller may be enabled. For example, if a user selects an advanced mode, the partial virtual controller may be enabled such that a game may be controlled but with reduced functionality, due to the border impeding a portion of the actuable area of the virtual controller. In this case, the virtual controller may include partial display of a control icon in the actuable area of the virtual controller. Thus, the partial virtual controller may enable controls from only those portions of the virtual controller that are visible to the user. Likewise, the portions of the virtual controller obstructed by the border of the display may be out of view and unactuable, resulting in reduced functionality.

FIG. 5 is a graphical view of a thumb up event that may be detected when a user attempts to actuate an ancillary control icon following use of a primary control icon such as the virtual joystick described above. As shown in FIG. 5, neutral position 50 may be established to control virtual controller 14. Once established, the virtual controller input module 42 may detect a digit up event 58, and further may detect a subsequent digit down position, for example at digit touch 60 within ancillary control zone 56.

Ancillary control zone 56 may be configured as a virtual button or a directional pad (D-pad) controller 62, or other user input mechanism. Thus, an ancillary control icon may be displayed in the ancillary control zone 56 that corresponds to the shape of a virtual button, D-pad, etc. By displaying such an ancillary control icon, virtual controller input module 42 may provide to a user, an indication of a position of ancillary control zone 56. Further, virtual controller input module 42 may be configured to determine an ancillary control input parameter based on the subsequent position or relative movement of a user digit in the ancillary control zone. Therefore, virtual controller input module 42 may generate controller input message 46 so as to further include an indication of the ancillary control input parameter. It will be appreciated that ancillary control zone 56 alternatively may be configured in various other configurations to enable user input that is relevant to a other programs.

In some embodiments, upon detecting the subsequent digit down position in an ancillary control zone, virtual controller input module 42 may be configured to inhibit repositioning of the neutral position. In this situation, the virtual controller input module determines that the user hand has moved not due to unintended creep, but rather due to an intention of the user to control an ancillary control that is a predetermined distance and direction from a the virtual control that functions as a primary control. In such a case, the virtual controller input module refrains from repositioning the virtual controller, and instead enables the user to interact with an ancillary control positioned in the ancillary control zone. In this manner, a user may switch his or her thumb back and forth between a primary joystick controller and an ancillary D-pad controller, for example.

FIG. 6 is a flowchart illustrating a method 600 for a computing device configured to receive input via a virtual controller 14 for a multi-touch display. Method 600 may be an input method for use with a computing device having touch sensitive display such as a multi-touch display including a touch sensor configured to detect a plurality of touches of a digit of a user. It will be appreciated that method 600 may be performed using the software and hardware components of computing device 10 described above, or using other suitable components.

Method 600 begins at 602 and includes detecting an initial digit down position on the touch sensitive display via the touch sensor. Method 600 advances to 604 and includes establishing a neutral position for a virtual controller at the digit down position, as described above.

Method 600 proceeds to 606 and includes detecting a subsequent movement of the digit relative to the initial digit down position. Method 600 advances to 608 and includes determining a controller input parameter based on the subsequent movement of the digit relative to the initial digit down position. For example, the controller input parameter may include direction, velocity and/or magnitude associated with the subsequent movement to a control icon such as a virtual joystick displayed on a multi-touch display. Other controller input parameters may also be detected, as described above.

Method 600 may proceed to 610 and include detecting a pressure of the digit against the multi-touch display during the subsequent movement. Therefore, method 600 may proceed to 612 and include generating a controller input message indicating the determined controller input parameter and may further include an indication of the detected pressure.

From 612, method 600 may proceed both to 614 and 622, asynchronously. At 622, method 600 includes sending the controller input message including the controller parameter to a program executed on the computing device. In some embodiments the steps 602-622 may be implemented by an API, while step 624 may be implemented by a program executed on the computing device. Thus, the process flow from 622 to 624 may exit operating system/API space and enter program space. At 624, the method may include, at the program, adjusting a GUI element based on the received controller input message. From 624, method 600 may end or alternatively may loop to step 606 to continue detecting input.

Returning to the conclusion of step 612, the method may also branch to 614, where the method includes deciding if a digit up event has occurred, based on detecting a lack of contact with the display for a predetermined period of time, for example. If the answer to 614 is NO, method 600 proceeds to 606 and resumes detecting input. If the answer to 614 is YES, method 600 proceeds to 616 and includes detecting a subsequent digit down position.

Method 600 then continues to 618 and includes determining if a subsequent digit down position has been detected in the ancillary control zone. If the answer to 618 is NO, method 600 proceeds to 604 to reestablish the neutral controller position. In other words, 604 may include repositioning the neutral position for the virtual controller at the subsequent digit down position, as described above.

If the answer to 618 is YES, the neutral position is not repositioned. Rather, method 600 proceeds to 620 and includes determining an ancillary control input parameter based on the subsequent digit down position in the ancillary control zone. For example, an ancillary control icon may be displayed in the ancillary control zone, which may be configured as a D-pad controller, and an example ancillary control input parameter may be a D-pad controller down event. Other examples are also discussed above. From 620 method 600 returns to 612 where generating a controller input message may include an indication of the ancillary control input parameter.

In some embodiments, as discussed above, some portions of method 600 may be performed by an API executed on the computing device. For example, an API may perform detecting the initial digit down position, establishing the neutral position, detecting the subsequent movement, determining the controller input parameter and/or generating the controller input message.

In some embodiments, as discussed above, some portions of method 600 may further include determining a nearest acceptable virtual controller position if a digit touch such as a digit down position and/or a subsequent digit down position occurs in a region adjacent a border of the touch sensitive display that would result in an actuable area of the virtual controller being impeded by the border. The nearest acceptable virtual controller position may be determined as described above. The virtual controller may be positioned and a control icon may be displayed at the nearest acceptable virtual controller position, rather that at the neutral position detected by the digit touch. In other examples, the detected neutral position may be rejected without displaying the nearest acceptable virtual controller position, or the virtual controller may be partially viewable and actuable, as discussed above.

It will be appreciated that the above described systems and methods may be implemented to enable a user to interact with a program using a virtual controller displayed on a touch sensitive display that is configured receive relative input, and that also may have associated ancillary controls. Further, the virtual controller may conveniently reposition its neutral position to track any changes in hand position of the user while the user simultaneously grips the device and actuates the controls. As a result, controller misstrikes be avoided and the user experience may be enhanced.

The terms "module," "program," and "engine" are used herein to refer to software that performs one or more particular functions when executed by a processor of a computing device. These terms are meant to encompass individual or groups of executable files, data files, libraries, drivers, scripts, database records, for example. The embodiments described herein show one example organization of these modules, programs, and engines, however, it should be appreciated that the functions described herein may be accomplished by differently organized software components. Further, it will be appreciated that a multi-touch display is a display that can concurrently sense a plurality of touches on the display.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An input method for use with a computing device having a touch sensitive display including a touch sensor configured to detect touches of a digit of a user, the method comprising:
   during game play of a program executed on a processor of the computing device:
   establishing a neutral position for a virtual controller at a detected initial digit down position on the touch sensitive display, the virtual controller being a virtual joystick controller;
   detecting a digit up event subsequent to establishing the neutral position;
   detecting a subsequent digit down position;
   detecting creep between the subsequent digit down position and the initial digit down position at which the neutral position was established; and
   repositioning the neutral position for the virtual controller at the subsequent digit down position upon detecting the creep;
   determining that a border of the display impedes a portion of an actuable area of the virtual controller following repositioning;
   partially displaying a control icon in the actuable area of the virtual controller; and
   inhibiting display and actuability of portions of the virtual controller obstructed by the border of the display.

2. The input method of claim 1, wherein the digit up event is a lack of contact of the digit and the display for a predetermined threshold period of time.

3. The input method of claim 1, wherein the digit is a thumb.

4. The input method of claim 1, further comprising determining a controller input parameter based on subsequent movement of the digit relative to the subsequent digit down position, wherein determining the controller input parameter includes determining a direction, velocity, and/or relative magnitude of the subsequent movement of the digit relative to the subsequent digit down position.

5. The input method of claim 4, wherein establishing the neutral position, detecting the digit up event, detecting the subsequent digit down position, detecting creep, repositioning the neutral position for the virtual controller, determining that a border of the display impedes a portion of an actuable area, partially displaying a control icon, and inhibiting display and actuability of portions of the virtual controller are performed by an application programming interface executed on the computing device, the method further comprising:
   outputting the controller input message from the application programming interface to a program executed on the computing device.

6. The input method of claim 4, further comprising:
detecting pressure of the digit against the touch sensitive display during detection of the subsequent digit down position and wherein generating the controller input message includes an indication of the detected pressure.

7. The input method of claim 6, wherein detecting pressure includes determining pressure from changes in an area of the touch associated with the digit over time or determining pressure from a pressure sensor coupled to the touch sensitive display.

8. The input method of claim 1, wherein the virtual controller includes an ancillary control zone that is configured as a virtual button or a directional pad.

9. A computing device, comprising:
a touch sensitive display including a touch sensor configured to detect touches of a digit of a user;
a virtual controller input module executed by a processor of the computing device, the virtual controller input module being configured to, during game play of a program executed on the processor of the computing device:
establish a neutral position for a virtual controller at a detected initial digit down position on the touch sensitive display, the virtual controller being a virtual joystick controller;
detect a digit up event subsequent to establishing the neutral position;
detect a subsequent digit down position;
detect creep between the subsequent digit down position and the initial digit down position at which the neutral position was established; and
reposition the neutral position for the virtual controller at the subsequent digit down position upon detecting the creep;
determine that a border of the display impedes a portion of an actuable area of the virtual controller following repositioning;
partially display a control icon in the actuable area of the virtual controller; and
inhibit display and actuability of portions of the virtual controller obstructed by the border of the display.

10. The computing device of claim 9, wherein the digit is a thumb.

11. The computing device of claim 9, wherein the virtual controller input module is configured to display a control icon anchored at the neutral position, the control icon providing a visual indication to the user of a positioning of the control.

12. The computing device of claim 9, wherein the computing device is configured as a mobile telephone or tablet computer.

13. The computing device of claim 9, wherein the digit up event is a lack of contact of the digit and the display for a predetermined threshold period of time.

14. The computing device of claim 9, wherein the virtual controller input module is configured to determine a controller input parameter based on subsequent movement of the digit relative to the subsequent digit down position, wherein determining the controller input parameter includes determining a direction, velocity, and/or relative magnitude of the subsequent movement of the digit relative to the subsequent digit down position.

15. The computing device of claim 9, wherein the virtual controller input module is further configured to:
detect pressure of the digit against the touch sensitive display during detection of the subsequent digit down position; and
generate a controller input message that includes an indication of the detected pressure.

16. The computing device of claim 15, wherein the virtual controller input module is further configured to detect the pressure of the digit by determining pressure from changes in an area of the touch associated with the digit over time or determining pressure from a pressure sensor coupled to the touch sensitive display.

17. The computing device of claim 9, wherein the virtual controller includes an ancillary control zone that is configured as a virtual button or a directional pad.

* * * * *